United States Patent
Nakakuki et al.

(10) Patent No.: US 6,406,771 B1
(45) Date of Patent: Jun. 18, 2002

(54) OPTICAL RECORDING MEDIUM AND OPTICAL RECORDING APPARATUS

(75) Inventors: Hideo Nakakuki; Takeshi Arai; Toshihisa Nonaka, all of Shiga (JP)

(73) Assignee: Toray Industries, Inc., Tokyo (JP)

( * ) Notice: Subject to any disclaimer, the term of this patent is extended or adjusted under 35 U.S.C. 154(b) by 26 days.

(21) Appl. No.: 09/692,458

(22) Filed: Oct. 20, 2000

(30) Foreign Application Priority Data

Oct. 29, 1999 (JP) .......................................... 11-308635
Jun. 14, 2000 (JP) ....................................... 2000-178062

(51) Int. Cl.$^7$ ................................................. B32B 3/02
(52) U.S. Cl. ................. 428/64.1; 428/64.5; 430/270.13
(58) Field of Search ............................ 428/64.1, 64.4, 428/64.5, 64.6, 913; 430/270.13, 495.1, 945; 369/283, 288

(56) References Cited

FOREIGN PATENT DOCUMENTS

| EP | 0 825 595 | 2/1998 | ............ G11B/7/24 |
| EP | 0 945 860 | 3/1999 | ............ G11B/7/24 |
| JP | 8-190734 | 7/1996 | |

OTHER PUBLICATIONS

European Search Report for EP 00 30 9494 dated Sep. 20, 2001.

*Primary Examiner*—Elizabeth Evans Mulvaney
(74) *Attorney, Agent, or Firm*—Morrison & Foerster, LLP

(57) ABSTRACT

The object of this invention is to provide a rewritable phase change type optical recording medium and an optical recording apparatus that are good in erasure characteristics and small in jitter even in high linear velocity high density recording, are unlikely to cause cross erasure even in the use of a substrate with a narrow track width, are unlikely to be deteriorated in signal quality even after repeated irradiation with a laser beam, and are good also in storage durability.

The object of this invention can be achieved by a phase change type optical recording medium, characterized in that at least a first dielectric layer, a first boundary layer, a recording layer, a second boundary layer, an absorption correction layer and a reflection layer are provided in this order on a substrate, that the recording layer has a specific composition, that the first and second boundary layers are respectively mainly composed of at least one selected from carbon, carbides, oxides and nitrides, and that the absorption correction layer is 1.0 to 4.0 in refractive index and 0.5 to 3.0 in attenuation coefficient.

12 Claims, No Drawings

OPTICAL RECORDING MEDIUM AND OPTICAL RECORDING APPARATUS

BACKGROUND OF THE INVENTION

This invention relates to an optical recording medium and an optical recording apparatus that allow information to be recorded, erased and reproduced by irradiation with a laser beam. Particularly, this invention relates to a rewritable phase change type optical recording medium that allows information signals to be recorded at high speeds and high densities.

A rewritable phase change type optical recording medium has a recording layer mainly composed of tellurium, etc., and at the time of recording, the recording layer in the crystalline state is irradiated with focused laser beam pulses for a short time, to be partially molten. The molten portion is quickly cooled by thermal diffusion and solidified, to form recorded marks of the amorphous state. The light reflectance of the recorded marks is lower than that of the crystalline state and can be optically reproduced as recorded signals. For erasure, the mark portions are irradiated with a laser beam, to be heated to a temperature lower than the melting point of the recording layer and higher than the crystallization temperature, for crystallizing the recorded marks of the amorphous state for return into the original non-recorded state. As the materials of recording layers of such rewritable phase change type optical recording media, alloys such as $Ge_2Sb_2Te_5$ (N. Yamada et al., Proc. Int. Symp. on Optical Memory, 1987, p. 61–66) are known.

In an optical recording medium using a Te alloy as the recording layer, the crystallization rate is high, and simply by modulating the irradiation power, high speed overwriting by one circular beam can be executed. In an optical recording medium using such a recording layer, usually, one each heat resistant and translucent dielectric layer is formed on both the sides of the recording layer, to prevent that the recording layer is deformed or opened at the time of recording. Furthermore, a technique in which a light-reflecting metallic reflection layer of light-reflecting Al, etc. is laminated on the dielectric layer on the side opposite to the incident optical light falling side, to improve the signal contrast at the time of reproduction by an optical interference effect is known.

The rewritable phase change type optical recording medium has such a problem in the repetition durability of the disc, that repeated overwriting causes the reproduced signal amplitude (contrast) to decline for aggravating the jitter characteristics or causes the burst defect due to the delamination or breaking of the protective layer. As a means for improving the repetition durability, it is known to form a diffusion prevention layer in contact with the recording layer, for example, as described in JP, 11-115315, A.

However, as the optical recording medium becomes higher in linear velocity and higher in density, there arises a problem that the erasure characteristics are aggravated in the conventional optical recording medium. That is, if overwrite recording is carried out on a track having already recorded signals, the forms and positions of recorded marks are modulated by the signals existing before overwriting, to lower the erasure characteristics. As a result, there arises a problem that compared to the recording of the first time, the jitter characteristics are aggravated.

As a means for improving the erasure characteristics, a technique for forming an absorbable layer for absorbing the light. transmitting the recording layer is proposed, for example, in JP, 5-159360, A. However, the absorbable layer proposed here is an absorbable layer composed of a metal such as Ti, Ni, W, Mo, V, Nb, Cr or Fe is insufficient as a means for improving the erasure characteristics.

Furthermore, as the optical recording medium becomes higher in linear velocity and higher in density, there arises a problem that since the recorded marks become smaller in size, the signal contrast becomes lower to aggravate the jitter.

Moreover, in the conventional optical recording media, it can happen that if a disc having signals recorded is allowed to stand for a long time, the recorded marks vanish. Furthermore, if an optical recording medium having signals recorded is allowed to stand for a long time and has other signals overwritten, it can happen that the jitter characteristics are aggravated compared to a case of immediate overwriting. So, the optical recording medium has a problem of storage durability.

Furthermore, the phenomenon called the cross erasure that if the track width is narrowed to achieve a higher density, a laser beam also acts on an adjacent track, to affect the recorded marks in the adjacent track, for aggravating the jitter characteristics is also a serious problem. This problem becomes more serious especially when the track width is 0.7×d (d is the laser beam diameter on the recording surface) or less.

It can also happen as a problem that if the laser beam is repetitively applied for reproduction, the recorded marks are partially crystallized to deteriorate the signal quality (so-called reproducing light deterioration). In an optical recording medium with a higher crystallization rate for allowing higher linear velocity recording, the problems of cross erasure and reproducing light deterioration are more likely to occur.

SUMMARY OF THE INVENTION

The object of this invention is to provide a rewritable phase change type optical recording medium and an optical recording apparatus that are good in the erasure characteristics and small in jitter, and unlikely to cause the cross erasure and the reproducing light deterioration and good also in the storage durability even if recording is executed at a high linear velocity at a high density. An object of this invention can be achieved by an optical recording medium, that allows information to be recorded, erased and reproduced by laser beam irradiation, and in which the recording and erasure of information are achieved by reversible phase change between the amorphous phase and the crystalline phase, characterized in that at least a first dielectric layer, a first boundary layer, a recording layer, a second boundary layer, an absorption correction layer and a reflection layer are provided in this order on a substrate, that the composition of said recording layer is represented by general formula

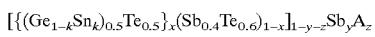

(where A denotes an element selected from the elements belonging to the group 3 through group 14 of the $3^{rd}$ period through $6^{th}$ period of the periodic table excluding Ge, Sb and Te), that x, y, z and k are in the ranges respectively represented by the following formulae (1) or (2)

$$0.5 \leq x \leq 0.95,\ 0 \leq y \leq 0.08,\ 0 < z \leq 0.2,\ k=0 \tag{1}$$

$$0.5 \leq x \leq 0.95,\ 0.01 \leq y \leq 0.08,\ z=0,\ 0 \leq k \leq 0.5 \tag{2}$$

that the first boundary layer and the second boundary layer are respectively mainly composed of at least one selected from carbon, carbides, oxides and nitrides, and that the absorption correction layer is 1.0 to 4.0 in refractive index and 0.5 to 3.0 in attenuation coefficient.

Another object of this invention can be achieved by an optical recording apparatus, having an optical head and an optical recording medium, in which the laser beam from said optical head is applied to allow information to be recorded, erased and reproduced by reversible phase change between the amorphous phase and the crystalline phase in said optical recording medium, characterized in that the linear velocity of laser beam irradiation is $7.5 \times 10^6 \times d$ (d is the laser beam diameter on the recording surface) or more per second, that the length of the shortest mark of the recorded marks recorded according to the mark edge method by the laser beam is $0.55 \times d$ or less in the laser beam propagation direction, that the track width of the optical recording medium is $0.7 \times d$ or less, and that said optical recording medium is the above-mentioned optical recording medium.

In this invention, "mainly composed of" means that the ingredient concerned is contained by 50 wt % or more in the layer concerned. It is more preferable that the ingredient concerned is contained by 80 wt % or more in the layer concerned.

The laser beam diameter d refers to the diameter at which the intensity becomes $1/e^2$ of the central intensity in a laser beam with intensities distributed according to the Gaussian distribution.

It can be considered that one of the causes in the problem that the erasure characteristics are not good is that since the difference between the reflectance of the recorded mark portions of the amorphous state and the reflectance of the region of the crystalline state in the recording layer is large, the quantity of light absorbed by the recorded mark portions of the amorphous state becomes larger than the quantity of light absorbed by the region of the crystalline state. As a result, it can be considered that since the pre-recorded mark portions are heated quickly during the recording with a laser beam, the overwritten signals are modulated by the signal components existing before overwriting, to lower the erasure rate.

If an optical recording medium having signals recorded is allowed to stand for a long time, the reproduced signal intensity may decline and the overwriting jitter becomes very deteriorated. It can be considered that the possible causes of the phenomena are that since the optical recording medium is allowed to stand for a long time, the recorded marks of the amorphous state change, for example, in atomic arrangement or that the dielectric layer and the recording layer are caused to react with each other.

It is considered that the causes of the cross erasure and the reproducing light deterioration are that since the light absorptivity in the amorphous region of the recording layer is higher than the light absorptivity in the crystalline region, the recorded mark portions are likely to rise in temperature, and that since a recording layer composition with a high crystallization rate is used to allow high linear velocity recording, the recorded marks are crystallized even by a low laser power such as the end of a laser beam or reproducing light.

The inventors studied intensively and found that the boundary layers provided in contact with the recording layer on both sides of it are effective for improving the erasure characteristics, the overwriting jitter, storage durability, and also the reproduction characteristics and overwriting characteristics after long-term storage.

Furthermore, they found a recording layer composition large in the reflectance difference caused by phase change and stable in the amorphous phase, to allow both good jitter and good storage durability to be obtained. Furthermore, they found that said recording layer composition is effective also for decreasing the cross erasure and the reproducing light deterioration.

Furthermore, by providing an absorption correction layer between the second boundary layer and the reflection layer and selecting the material of the absorption correction layer for specifying the optical constants, i.e., the refractive index and the attenuation coefficient, an optical design could be made to ensure that the ratio of the light absorptivity of the crystalline region of the recording layer to the light absorptivity of the amorphous region (Ac/Aa) becomes larger than the conventional ratio and that the reflectance difference between the crystalline region and the amorphous region also becomes larger. They found that this optical design allowed a high contrast and erasure characteristics to be obtained, and could improve the overwriting jitter further. They also found that the absorption correction layer could decrease the light absorption of the recorded mark portions and could reduce the influence of the beam falling at the time of recording on an adjacent track, to allow the cross erasure to be decreased. They also found that the durability against the reproducing light deterioration could be improved greatly for the same reason.

The above technique could provide, for the first time, a rewritable phase change type optical recording medium having such advantages that the erasure characteristics are good while the jitter is small even in high linear velocity high density recording at a linear velocity of $7.5 \times 10^6 \times d$ (d is the laser beam diameter on the recording surface) or higher in laser beam irradiation and at such a density that the length of the shortest mark of the recorded marks recorded by a laser beam according to the mark edge method is $0.55 \times d$ or less in the laser beam propagation direction, that even if a substrate with a recording track width of $0.7 \times d$ or less is used, the cross erasure is less likely to occur, that even if the laser beam is applied repetitively for reproduction, the signal quality is unlikely to be deteriorated, and that the storage durability is also good.

Furthermore, the optical recording medium of this invention is also good in repetition durability, since the recording layer is kept between boundary layers.

DESIRABLE EMBODIMENTS

A typical layer constitution of the optical recording medium of this invention has a first dielectric layer, a first boundary layer, a recording layer, a second boundary layer, an absorption correction layer and a reflection layer laminated in this order on a transparent substrate. These layers are described below sequentially.

The first dielectric layer is provided for preventing that the substrate is damaged by heat during recording and for preventing that the recording layer is deformed or opened by heat. The materials that can be used for the first dielectric layer include inorganic compounds such as ZnS, $SiO_2$, silicon nitride and aluminum oxide. Especially a mixture consisting of ZnS and $SiO_2$ is preferable. Since this material is small in residual stress, it is unlikely to cause, for example, the burst deterioration caused by repeated overwriting. Furthermore, a mixture consisting of ZnS, $SiO_2$ and carbon is especially preferable since it is further smaller in the residual stress of the film made of it and is unlikely to cause the deteriorations of recording sensitivity, carrier-to-noise ratio (C/N), erasure rate, etc.

It is preferable that the first dielectric layer is 1.9 to 2.4 in refractive index and 0.1 or less in attenuation coefficient.

Such a dielectric layer allows a design that ensures a high reflectance difference due to an optical interference effect. The thickness of the first dielectric layer can be decided in relation with optical conditions, but it is preferable that the thickness is to 500 nm. If the thickness is more than the range, for example, cracking is likely to occur. If the thickness is less than the range, the substrate is likely to be thermally damaged by repeated overwriting, and the repetition characteristics are likely to be deteriorated. An especially preferable range of thickness is 50 nm to 200 nm.

In this invention, one each boundary layer must be provided on both sides of the recording layer in contact with it. The boundary layers can prevent the deterioration of characteristics caused by repeated overwriting. The reason is considered to be that the layers act as barrier layers for preventing the diffusion of atoms from the dielectric layers into the recording layer. Furthermore, the boundary layers improve the erasure characteristics. It is considered that the boundary layers raise the crystallization rate, to improve the erasure characteristics. Furthermore, the boundary layers can also improve the storage durability, i.e., the reproduction characteristics and the overwriting characteristics after long-term storage. The reason is estimated to be that the change of states such as atomic arrangement in the recording layer and the reaction between the dielectric layers and the recording layer can be prevented even if the recording medium is allowed to stand for a long time.

The first boundary layer and the second boundary layer are respectively mainly composed of at least one selected from carbon, carbides, oxides and nitrides. In this case, "mainly composed of" means that the ingredient concerned is contained by 50 wt % or more. It is more preferable that the content is 80 wt % or more. The carbides, oxides and nitrides can be the carbides, oxides and nitrides of the elements belonging to group 3 through group 14 of the $3^{rd}$ period through $6^{th}$ period of the periodic table. Particularly, the carbide, oxide or nitride of a metal selected from Al, Si, Sc, Ti, V, Cr, Mn, Fe, Co, Ni, Cu, Zn, Ga, Ge, Y, Zr, Nb, Mo, Ru, Rh, Pd, Ag, Cd, In, Sn, La, Hf, Ta, W, Re, Ir, Pt, Au, Tl and Pb can be preferably used. Especially the carbide, oxide or nitride of a metal selected from Si, Ge, Ti, Zr, Ta, Hb, Hf, Al, Y, Cr, W, Zn, In and Sn can be preferably used.

As the material of the first boundary layer, a material mainly composed of carbon is especially preferable, and in this case, the long-term storage stability of recorded marks can be improved. If the recording layer good in long-term storage stability described later is used, even a material mainly composed of at least one selected from carbides, oxides and nitrides can provide good long-term storage stability. The material of the second boundary layer can be the same as or different from the material of the first boundary layer. In view of long-term storage stability, it is preferable that the first boundary layer and the second boundary layer are respectively mainly composed of carbon.

Furthermore, in view of repetition durability improvement, it is also preferable that the first boundary layer and the second boundary layer are respectively mainly composed of a nitride. Especially a material mainly composed of $GeN_x$ is preferable since it is excellent in the adhesion to the recording layer, and it is more preferable that the x is in a range of $0.8 \leq x \leq 1.33$. It is also preferable to add at least one selected from Cr, Ti, Mn, Zr, Nb, Mo, Ta, Fe, Co, Ni, Y and La, since the effect of inhibiting the oxidation of Ge for improving the long-term storage stability can be expected. In $GeCr_y$ nitrides, it is preferable that the y is in a range of $0 \leq y \leq 0.5$, and $GeCr_{0.25}$ nitride is especially preferable.

It is preferable that the thickness of each of the boundary layers is 0.5 nm to 10 nm, in view of unlikelihood of delamination and optical conditions. If the thickness is more than 10 nm, the boundary layer is likely to be delaminated from the first dielectric layer or the recording layer. If less than 0.5 nm, it is difficult to form the. layer with a uniform thickness by vapor deposition, and the effect of forming the boundary layers may not be obtained. If the boundary layer is mainly composed of carbon, it is especially preferable that the thickness is 0.5 nm to 4 nm, in view of repetition characteristics and long-term storage stability. It can be considered that the delamination at the interface is unlikely to occur since the carbon layer is relatively strongly bonded to the adjacent Ge—Sb—Te recording layer and the ZnS—$SiO_2$ dielectric layer by chemical bonding or similar interaction. However, if the thickness of the carbon layer is too large, the weak graphite sub-layer existing about the center in the normal direction becomes thick. So, it can be considered that this portion is likely to be destroyed, for example, by repeated action, and that a burst error is likely to occur.

When the carbon layer is formed with sputtering, the introducing gas can be a rare gas such as Ar gas, but hydrogen can also be mixed. Another material can also be mixed with the carbon layer, but to obtain good characteristics, it is preferable that carbon is contained by 80 mol% or more.

The composition of the recording layer of this invention must be in the range of the following formula.

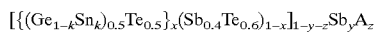

(where A denotes an element selected from the elements belonging to the group 3 through group 14 of the $3^{rd}$ period through $6^{th}$ period of the periodic table excluding Ge, Sb and Te), and x, y, z and k are in the ranges respectively represented by the following formulae (1) or (2)

$$0.5 \leq x \leq 0.95,\ 0 \leq y \leq 0.08,\ 0 < z \leq 0.2,\ k=0 \qquad (1)$$

$$0.5 \leq x \leq 0.95,\ 0.01 \leq y \leq 0.08,\ z=0,\ 0 \leq k \leq 0.5 \qquad (2)$$

If x<0.5, a sufficient signal intensity cannot be obtained since the reflectance change accompanying the phase change of the recording layer becomes small, and good jitter may not be obtained. If x>0.95, since the crystallization rate becomes low, the erasure characteristics are aggravated and the overwriting jitter may be aggravated. If y>0.08, the initial erasure characteristics may be aggravated or the overwriting characteristics after long-term storage may be aggravated. If z>0.2, since the crystallization rate becomes low, it can happen that the erasure characteristics are aggravated, that the overwriting jitter is aggravated, that the repetition characteristics are greatly deteriorated due to phase separation, and that the overwriting characteristics after long-term storage are aggravated. If z=0 and y<0.01, then, the amorphous stability is low, and the reproduction characteristics after long-term storage may be aggravated.

In the case of z>0, k is zero. If z=0, a composition in which Ge is partially substituted by Sn in a range of $0 \leq k \leq 0.5$ is preferable for better erasure characteristics and better storage durability.

It is preferable to use a recording layer satisfying the following formula, since better amorphous stability and better long-term storage stability can be obtained.

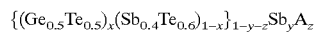

$$0.5 \leq x \leq 0.95,\ 0.03 \leq y \leq 0.08,\ 0 \leq z \leq 0.2$$

In the above-mentioned composition range of the recording layer, it is preferable in view of better erasure characteristics that the molar fraction of Sb in three elements of Ge, Sb and Te in the recording layer is 20% or less, i.e., $$0.4(1-x)(1-y)+y<0.2$$

Furthermore, the recording layer may also contain nitrogen and oxygen, and the argon used for sputtering can also be contained.

It is preferable that the thickness of the recording layer of this invention is 5 nm to 40 nm. If the thickness of the recording layer is less than the above range, the deterioration of the recording characteristics by repeated overwriting is remarkable. If the thickness of the recording layer is more than the above range, the migration of the recording layer by repeated overwriting is likely to occur, to remarkably aggravate the jitter. A preferable thickness range of the recording layer is 7 nm to 25 nm, to obtain the moderate cooling rate of the recording layer during recording. Furthermore, for keeping the ratio of the absorptivity of the crystalline region to that of the amorphous region as large as possible for improving the erasure characteristics, it is preferable that the recording layer is thinner. A more preferable thickness range of the recording layer for this purpose is 7 nm to 17 nm.

In this invention, for adjusting, for example, the recording sensitivity, a second dielectric layer may also be provided between the second boundary layer and the reflection layer. The material of the second dielectric layer can be the same as or different from that of the first dielectric layer. It is preferable that the thickness of the second dielectric layer is 2 nm to 50 nm. If the thickness of the second dielectric layer is less than the above range, defects such as cracking are caused, to lower the repetition durability unpreferably. If the thickness of the second dielectric layer is more than the above range, the cooling rate of the recording layer declines unpreferably. The thickness of the second dielectric layer more directly affects the cooling of the recording layer, and to obtain better erasure characteristics and repetition durability, a thickness of 30 nm or less is more effective. It is also preferable that the second dielectric layer is formed with a semi-transparent material, since it can absorb light, for using it as thermal energy efficiently for recording and erasure. For example, a mixture consisting of ZnS, $SiO_2$ and carbon is preferable since the residual stress of the film is small and since the deterioration of recording sensitivity, carrier-to-noise ratio (C/N), erasure rate, etc. is unlikely to occur even if recording and erasure are repeated.

In this invention, the absorption correction layer must be provided between the second boundary layer or the second dielectric layer and the reflection layer. As described before, in the conventional constitution, the light absorptivity of the recording layer of the amorphous state becomes larger than the light absorptivity of the recording layer of the crystalline state, but the newly provided absorption correction layer can decrease the light absorptivity of the recording layer of the amorphous state, to lessen the difference between the light absorption of the amorphous state and that of the crystalline state and furthermore to make the light absorption of the amorphous state even smaller than that of the crystalline state. The effect of adsorption correction reduces the difference in the temperature rise during recording between the crystalline region and the amorphous region, to reduce the deformation and displacement of recorded marks. So, the erasure characteristics and the overwriting jitter can be improved. The absorption correction effect is decided by the thickness and optical constants (refractive index and attenuation coefficient) of respective layers, and especially depends on the optical constants of the absorption correction layer. It is necessary that the refractive index and the attenuation coefficient of the absorption correction layer are adequate, and it is necessary that the refractive index is 1.0 to 4.0 while the attenuation coefficient is 0.5 to 3.0. In this case, the recording medium can be designed to keep the reflectance difference due to phase change large and to keep the absorption correction effect large. It is preferable to measure the refractive index and the attenuation coefficient at the wavelength of the laser beam used for recording or reproduction. It is most preferable to measure at 660 nm.

The material preferably used for the absorption correction layer of this invention is a material mainly composed of at least one selected from compounds of various alloys and metals, and mixtures thereof, particularly, for example, solid solution alloys, intermetallic compounds, oxides, carbides and nitrides respectively containing at least one of silicon, germanium, titanium, zirconium, tungsten, chromium, molybdenum and aluminum. Especially the oxide or nitride of at least one of aluminum and chromium is preferable since it is easy to control optical constants. Especially an aluminum oxide, i.e., $AlO_x$ with x in a range of 0.3 to 0.8 is preferable since the absorption correction layer can have moderate optical constants. A material with 10 wt % or less of a metal such as chromium or titanium or the oxide thereof mixed in an aluminum oxide is also preferable because of such effects as corrosion resistance improvement.

It is preferable that the thickness of the absorption correction layer is 1 nm or more in view of the light absorption correction effect and 200 nm or less in view of productivity. The thickness of the absorption correction layer depends on the optical constants of the absorption correction layer, but a thickness range of 10 nm to 100 nm is preferable.

The materials that can be used for the reflection layer include metals and alloys and mixtures of metals and metal compounds respectively capable of reflecting light. Particularly, metals with high reflectance such as Al, Au, Ag and Cu, alloys mainly composed of them, and metal compounds such as nitrides, oxides and chalcogenated compounds of Al, Si, etc. are preferable. Especially metals such as Al, Au and Ag and alloys mainly composed of them are preferable since high reflectance and high thermal conductivity can be obtained. Especially alloys mainly composed of Al or Ag are preferable since the material cost can be kept low. The thickness of the reflection layer is usually about 10 nm to 300 nm. A range of 30 nm to 200 nm is preferable since high recording sensitivity and large reproduced signal intensity can be obtained.

The method for producing the optical recording medium of this invention is described below. The method for forming the first dielectric layer, first boundary layer, recording layer, second boundary layer, second dielectric layer, absorption correction layer, reflection layer, etc. on a substrate can be a thin film forming method in vacuum, for example, vacuum evaporation, ion plating or sputtering, etc. Especially in view of easy control of composition and layer thickness, sputtering is preferable. The thickness of the recording layer, etc. formed can be controlled by monitoring the deposition state using a quartz oscillator thickness meter.

After the reflection layer is formed, a dielectric layer of ZnS, $SiO_2$ or ZnS—$SiO_2$, etc. or a protective layer made of a ultraviolet light curing resin, etc. can be formed as required for preventing flawing and deformation of the optical recording medium, as far as the effects of this invention are not remarkably impaired.

Furthermore, the optical recording apparatus of this invention has an optical head capable of irradiating with a laser beam, and the above-mentioned optical recording medium is irradiated with the laser beam from the optical head, to record, erase and reproduce information by the reversible phase change between the amorphous phase and the crystalline phase in the optical recording medium.

For high density recording, it is preferable that the wavelength of the laser beam is in a range from 645 nm to 660 nm. The laser beam wavelengths used for recording, erasing and reproducing information can be respectively equal or different. For high linear velocity recording, it is preferable that the linear velocity of laser beam irradiation is $7.5 \times 10^6 \times d$ (d is the laser beam diameter on the recording surface) or more per second.

For high density recording, it is preferable that the information recording method is the mark edge method. Furthermore, it is preferable that the length of the shortest mark of the recorded marks recorded by the mark edge method in the laser beam propagation direction is 0.55×d or less. Moreover, it is preferable that the track width is 0.7×d or less.

This invention is described below based on examples.
(Analyzing and Measuring Methods)

The compositions of the reflection layer and the recording layer were confirmed by ICP emission analysis (produced by Seiko Denshi Kogyo K.K.). The composition of the absorption correction layer was confirmed by Rutherford backward scattering analysis. The thickness of the recording layer, dielectric layer and reflection layer during formation were monitored using a quartz oscillator thickness meter. The thickness of each layer was measured by observing the section with a scanning or transmission electron microscope.

For the optical recording medium having the respective layers formed by sputtering, the recording layer on the entire disc surface was crystallized and initialized by a semiconductor laser beam with a wavelength of 830 nm before recording.

The recording properties were evaluated by executing mark edge recording according to the 8–16 modulation method using an optical head with an objective numerical aperture of 0.6 and a semiconductor laser wavelength of 660 nm (laser beam diameter 0.95 µm) at a linear velocity of 8.2 m/sec. The recording laser waveform was a general multi-pulse waveform, and a pattern adapted recording compensation method in which the recording pulse edge position was changed in response to the length of a recorded mark and the lengths of the spaces before and after it was adopted. The recording power and the erasing power were set at optimum values in each optical recording medium. The reproducing power was 1.0 mW.

The reflectance was obtained from the reproduction signal potential at the mirror portion of the optical recording medium.

The erasure characteristics were evaluated as described below. At first, at a recording frequency of 2.7 MHz, the longest recording mark (11T mark) was overwritten 10 times in the groove, and on it, at a recording frequency of 9.7 MHz, the shortest recording mark (3T mark, 0.42 µm in the length in the laser beam propagation direction) was overwritten once. With the ratio of the carrier of the shortest recorded mark to the carrier of the longest recorded mark after overwriting as the effective erasure rate, it was measured using a spectrum analyzer at a band width of 30 kHz.

Then, a random pattern was overwritten on the groove 100 times, and the jitter was measured using a time interval analyzer. In succession, a random pattern was overwritten on the adjacent tracks on both sides 100 times each and erased, and the jitter of the central track was measured again, to evaluate the rise of jitter caused by the cross erasure.

Furthermore, the durability against the reproducing light deterioration was evaluated by measuring the change of jitter after reproducing a recorded track at a reproducing power of 1.2 mW repetitively 1000 times.

The repetition durability was evaluated by measuring the jitter after overwriting100,000 times on the groove. Furthermore, the decline of the amplitude of signal waveform and the presence of burst defect were also observed using an oscilloscope.

The storage durability was evaluated by recording using a drive for evaluation capable of measuring the byte error rate, storing the recording medium in a 80° C. or 90° C. oven for an acceleration test, and evaluating the signal reproduction characteristics and the overwriting characteristics in reference to the byte error rates.

EXAMPLE 1

A polycarbonate substrate having a spiral groove with a thickness of 0.6 mm and a diameter of 12 cm at a pitch of 1.23 µm (land width 0.615 µm and groove width of 0.615 µm) was revolved at 40 rpm and was coated with layers by sputtering. At fist, a vacuum vessel was evacuated to $1 \times 10^{-4}$ Pa, and a ZnS target with 20 mol % of $SiO_2$ added was sputtered in 0.2 Pa argon gas atmosphere, to form a 135 nm thick first dielectric layer (refractive index 2.1, attenuation coefficient 0) on the substrate. Then, a carbon target was sputtered, to form a 2 nm carbon layer as the first boundary layer. In succession, an alloy target consisting of Ge, Sb and Te was sputtered to form a 10 nm thick recording layer of composition $Ge_{28.6}Sb_{17.8}Te_{53.6}$, i.e., $\{(Ge_{0.5}Te_{0.5})_{0.579}(Sb_{0.4}Te_{0.6})_{0.421}\}_{0.989}Sb_{0.011}$. Furthermore, a 2 nm thick germanium nitride layer ($GeN_{1.2}$) was formed as the secondary boundary layer by sputtering a germanium target using a mixed gas consisting of argon and nitrogen. In succession, a 26 nm thick second dielectric layer was formed by sputtering the same $ZnS$—$SiO_2$ target as used for the first dielectric layer. Moreover, as the absorption correction layer, an aluminum target was sputtered using a mixed gas consisting of argon and oxygen, to form a 50 nm thick aluminum oxide layer ($AlO_{0.41}$, refractive index 2.2, attenuation coefficient 2.1). In succession, $Al_{97.5}Cr_{2.5}$ alloy was sputtered, to form a 90 nm thick reflection layer. The disc was taken out of the vacuum vessel, and on the reflection layer, an acrylic ultraviolet light curing resin (SD-101 produced by Dainippon Ink & Chemicals, Inc.) was applied by spin coating, and cured by ultraviolet light irradiation, to form a 3 µm thick resin layer. Then, a slow-acting ultraviolet light curing resin was applied using a screen printing machine, and irradiated with ultraviolet light. The disc was joined with another disc produced similarly, to obtain an optical recording medium of this invention.

The difference between the reflectance of the recording layer in the crystalline state and that in the amorphous state was 20%, to show that a sufficient contrast could be secured. According to optical calculation at a wavelength of 660 nm, the ratio of the light absorptivity of the crystalline region of the recording layer to that of the amorphous region (Ac/Aa) was 1.0, to show that an absorption-correction effect could be obtained. The effective erasure rate measured was 28 dB, to show good erasure characteristics. The jitter after overwriting 100 times was as very good as a window width of 7.7%. The jitter containing the influence of cross erasure due to the repeated recording on the adjacent tracks was 7.9%, showing a small rise of jitter due to the cross erasure. Furthermore, the reproducing light deterioration was not observed. The jitter after overwriting 100,000times was as practically sufficiently small as 9.8%. The signal amplitude little changed compared with the signal amplitude after overwriting 100 times, and no burst defect was observed either. That is, it was found that there was no problem with the repetition durability.

The optical recording medium was used for recording once, and the byte error rate measured in this case was $1.0 \times 10^{-5}$. The optical recording medium as recorded was allowed to stand in air not adjusted in humidity by humidification, etc. at 80° C. for 100 hours. Then, the byte error rate of the same portion was measured and found to be $1.6 \times 10^{-5}$, showing little change, to show that the reproduction characteristics after long-term storage were good. Furthermore, overwriting was executed once on the same portion, and the byte error was found to be $3.2 \times 10^{-5}$, and it could be confirmed that the overwriting characteristics after long-term storage were also good enough. Moreover, the same optical recording medium was allowed to stand at 90° C. at 80% relative humidity for 140 hours, but no burst defect due to delamination was observed. That is, it could be confirmed that the storage durability was good.

EXAMPLE 2

An optical recording medium similar to that of Example 1 except that a 2 nm thick germanium nitride layer ($GeN_{1.2}$) was formed as the first boundary layer was prepared and evaluated. As shown in Table 2, it could be confirmed that all of erasure characteristics, jitter, cross erasure, reproducing light deterioration, repetition durability and storage durability were good.

EXAMPLE 3

An optical recording medium similar to that of Example 2 except that the composition of the recording layer was $Ge_{28.8}Sb_{18.8}Te_{532.4}$, i.e., $\{(Ge_{0.5}Te_{0.5})_{0.594}(Sb_{0.4}Te_{0.6})_{0.406}\}_{0.969}Sb_{0.31}$ was prepared and evaluated. As shown in Table 2, it could be confirmed that all of erasure characteristics, jitter, cross erasure, reproducing light deterioration, repetition durability and storage durability were good.

EXAMPLE 4

An optical recording medium similar to that of Example 1 except that a 2 nm thick carbon layer was formed as the second boundary layer was prepared and evaluated. As shown in Table 2, it could be confirmed that all of erasure characteristics, jitter, cross erasure, reproducing light deterioration, repetition durability and storage durability were good.

EXAMPLE 5

An optical recording medium similar to that of Example 3 except that 2 nm thick germanium chromium nitride layers ($GeCr_{0.25}N_{1.2}$) were formed as the first and boundary layers by sputtering a $GeCr_{0.25}$ target using a mixed gas consisting of argon and nitrogen was prepared and evaluated. As shown in Table 2, it could be confirmed that all of erasure characteristics, jitter, cross erasure, reproducing light deterioration, repetition durability and storage durability were good.

EXAMPLE 6

An optical recording medium similar to that of Example 1 except that an alloy target consisting of Ge, Sn, Sb and Te was sputtered to form a 10 nm thick layer with composition, $Ge_{22.2}Sn_{7.4}Sb_{7.1}Te_{53.3}$, i.e., $[\{(Ge_{0.75}Sn_{0.25})_{0.5}Te_{0.5}\}_{0.60}(Sb_{0.4}Te_{0.6})_{0.40}]_{0.987}Sb_{0.013}$ was prepared and evaluated. As shown in Table 2, it could be confirmed that all of erasure characteristics, jitter, cross erasure, reproducing light deterioration, repetition durability and storage durability were good.

EXAMPLE 7

An optical recording medium similar to that of Example 3 except that 2 nm thick aluminum oxide layers were formed as the first and second boundary layers by sputtering an aluminum oxide target using argon gas was prepared and evaluated. As shown in Table 2, it could be confirmed that all of erasure characteristics, jitter, cross erasure, reproducing light deterioration, repetition durability and storage durability were good.

EXAMPLE 8

An optical recording medium similar to that of Example 3 except that 2 nm thick silicon carbide layers were formed as the first and second boundary layers by sputtering a silicon carbide target using argon gas was prepared and evaluated. As shown in Table 2, it could be confirmed that all of erasure characteristics, jitter, cross erasure, reproducing light deterioration, repetition durability and storage durability were good.

EXAMPLE 9

An optical recording medium similar to that of Example 1 except that the composition of the recording layer was $Ge_{36}Sb_{12}Te_{52}$, i.e., $\{(Ge_{0.5}Te_{0.5})_{0.733}(Sb_{0.4}Te_{0.6})_{0.267}\}_{0.987}Sb_{0.013}$ was prepared and evaluated. As shown in Table 2, it could be confirmed that all of erasure characteristics, jitter, cross erasure, reproducing light deterioration, repetition durability and storage durability were good.

EXAMPLE 10

An optical recording medium similar to that of Example 1 except that the composition of the recording layer was $Ge_{28.3}Sb_{16.9}Te_{53.8}Nb_1$, i.e. , $\{(Ge_{0.5}Te_{0.5})_{0.572}(Sb_{0.4}Te_{0.6})_{0.428}\}_{0.99}Nb_{0.01}$ was prepared and evaluated. As shown in Table 2, it could be confirmed that all of erasure characteristics, jitter, cross erasure, reproducing light deterioration, repetition durability and storage durability were good.

Also when Al, Si, Sc, Ti, V, Cr, Mn, Fe, Co, Ni, Cu, Zn, Ga, Ge, Y, Zr, Mo, Ru, Rh, Pd, Ag, Cd, In, Sn, La, Hf, Ta, W, Re, Ir, Pt, Au, Tl or Pb was used instead of Nb in the composition of the recording layer, almost similar results could be obtained.

EXAMPLE 11

An optical recording medium similar to that of Example 1 except that a 50 nm thick aluminum oxide layer ($AlO_{0.64}$, refractive index 2.8, attenuation coefficient 1.5) was formed as the absorption correction layer by sputtering an aluminum target using a mixed gas consisting of argon and oxygen was prepared and evaluated.

As shown in Table 2, it could be confirmed that all of erasure characteristics, jitter, cross erasure, reproducing light deterioration, repetition durability and storage durability were good.

EXAMPLE 12

An optical recording medium similar to that of Example 1 except that a 50 nm thick chromium nitride layer ($CrN_{0.74}$, refractive index 3.2, attenuation coefficient 2.3) was formed as the absorption correction layer by sputtering a chromium target using a mixed gas consisting of argon and nitrogen was prepared and evaluated.

As shown in Table 2, it could be confirmed that all of erasure characteristics, jitter, cross erasure, reproducing light deterioration, repetition durability and storage durability were good.

EXAMPLE 13 optical recording medium similar to that of Example 1 except that a 50 nm thick chromium nitride layer ($CrN_{0.91}$, refractive index 3.5, attenuation coefficient 1.7) was formed as the absorption correction layer by sputtering a chromium target using a mixed gas consisting of argon and nitrogen was prepared and evaluated.

As shown in Table 2, it could be confirmed that all of erasure characteristics, jitter, cross erasure, reproducing light deterioration, repetition durability and storage durability were good.

EXAMPLE 14

An optical recording medium similar to that of Example 1 except that a 50 nm thick aluminum nitride layer (AlN, refractive index 2.2, attenuation coefficient 2.0) was formed as the absorption correction layer by sputtering an aluminum target using a mixed gas consisting of argon and nitrogen was prepared and evaluated.

As shown in Table 2, it could be confirmed that all of erasure characteristics, jitter, cross erasure, reproducing light deterioration, repetition durability and storage durability were good.

EXAMPLE 15

An optical recording medium similar to that of Example 3 except that 2 nm thick germanium nitride layers ($GeN_{0.8}$) were formed as the first and second boundary layers by sputtering a germanium target using a mixed gas consisting of argon and nitrogen was prepared and evaluated. As shown in Table 2, it could be confirmed that all of erasure characteristics, jitter, cross erasure, reproducing light deterioration, repetition durability and storage durability were good.

EXAMPLE 16

An optical recording medium similar to that of Example 3 except that 2 nm thick germanium chromium nitride layers ($GeCr_{0.25}N_{0.8}$) were formed as the first and second boundary layers by sputtering a $GeCr_{0.25}$ target using a mixed gas consisting of argon and nitrogen was prepared and evaluated. As shown in Table 2, it could be confirmed that all of erasure characteristics, jitter, cross erasure, reproducing light deterioration, repetition durability and storage durability were good.

EXAMPLE 17

An optical recording medium similar to that of Example 3 except that 2 nm thick germanium chromium nitride layers ($GeCr_{0.2}N_{1.2}$) were formed as the first and second boundary layers by sputtering a $GeCr_{0.2}$ target using a mixed gas consisting of argon and nitrogen was prepared and evaluated. As shown in Table 2, it could be confirmed that all of erasure characteristics, jitter, cross erasure, reproducing light deterioration, repetition durability and storage durability were good.

EXAMPLE 18

An optical recording medium similar to that of Example 3 except that 2 nm thick germanium chromium nitride layers ($GeCr_{0.4}N_{1.2}$) were formed as the first and second boundary layers by sputtering a $GeCr_{0.4}$ target using a mixed gas consisting of argon and nitrogen was prepared and evaluated. As shown in Table 2, it could be confirmed that all of erasure characteristics, jitter, cross erasure, reproducing light deterioration, repetition durability and storage durability were good.

EXAMPLE 19

As described for Example 1, a 120 nm thick ZnS—$SiO_2$ layer was formed as the first dielectric layer on the substrate, and a 2 nm thick carbon layer was formed as the first boundary layer. In succession, a 9 nm thick recording layer of composition $Ge_{36}Sb_{12}Te_{52}$, i.e., $\{(Ge_{0.5}Te_{0.5})_{0.733}(Sb_{0.4}Te_{0.6})_{0.267}\}_{0.987}Sb_{0.013}$ was formed, and furthermore a 2 nm thick carbon layer was formed as the second boundary layer. In succession, a 35 nm thick ZnS—$SiO_2$ layer was formed as the second dielectric layer, and a 70 nm thick aluminum oxide layer ($AlO_{0.41}$, refractive index 2.2, attenuation coefficient 2.1) was formed as the absorption correction layer by sputtering an aluminum target using a mixed gas consisting of argon and oxygen. In succession, a 90 nm thick reflection layer was formed by sputtering $Al_{97.5}Cr_{2.5}$ alloy.

As shown in Table 2, it could be confirmed that all of erasure characteristics, jitter, cross erasure, reproducing light deterioration, repetition durability and storage durability were good.

EXAMPLE 20

An optical recording medium similar to Example 19 except that a 50 nm thick chromium nitride ($CrN_{0.74}$, refractive index 3.2, attenuation coefficient 2.3) was formed as the absorption correction layer by sputtering a chromium target using a mixed gas consisting of argon and nitrogen was prepared and evaluated.

As shown in Table 2, it could be confirmed that all of erasure characteristics, jitter, cross erasure, reproducing light deterioration, repetition durability and storage durability were good.

EXAMPLE 21

As described for Example 1, a 70 nm thick ZnS—$SiO_2$ layer was formed as the first dielectric layer on the substrate, and a 2 nm thick carbon layer was formed as the first boundary layer. In succession, a 12nm thick recording layer of composition $Ge_{36}Sb_{12}Te_{52}$, i.e., $\{(Ge_{0.5}Te_{0.5})_{0.733}(Sb_{0.4}Te_{0.6})_{0.267}\}_{0.987}Sb_{0.013}$ was formed, and furthermore a 2 nm thick carbon layer was formed as the second boundary layer. In succession, a 15 nm thick ZnS—$SiO_2$ layer was formed as the second dielectric layer, and a 50 nm thick aluminum oxide layer ($AlO_{0.64}$, refractive index 2.8, attenuation coefficient 1.5) was formed as the absorption correction layer by sputtering an aluminum target using a mixed gas consisting of argon and oxygen. In succession, a 90 nm thick reflection layer was formed by sputtering $Al_{97.5}Cr_{2.5}$ alloy.

As shown in Table 2, it could be confirmed that all of erasure characteristics, jitter, cross erasure, reproducing light deterioration, repetition durability and storage durability were good.

EXAMPLE 22

An optical recording medium similar to Example 21 except that a 50 nm thick chromium nitride layer ($CrN_{0.91}$, refractive index 3.5, attenuation coefficient 1.7) was formed as the absorption correction layer by sputtering a chromium target using a mixed gas consisting of argon and nitrogen was prepared and evaluated.

As shown in Table 2, it could be confirmed that all of erasure characteristics, jitter, cross erasure, reproducing light deterioration, repetition durability and storage durability were good.

EXAMPLE 23

An optical recording medium similar to that of Example 22 except that the composition of the recording layer was $Ge_{35}Sb_{14}Te_{51}$, i.e., $\{(Ge_{0.5}Te_{0.5})_{0.733}(Sb_{0.4}Te_{0.6})_{0.267}\}_{0.967}Sb_{0.033}$, and that 2 mm thick germanium nitride layers ($GeN_{1.2}$) were formed as the first and second boundary layers by sputtering a germanium target using a mixed gas consisting of argon and nitrogen was prepared and evaluated.

As shown in Table 2, it could be confirmed that all of erasure characteristics, jitter, cross erasure, reproducing light deterioration, repetition durability and storage durability were good.

EXAMPLE 24

An optical recording medium similar to that of Example 23 except that 2 nm aluminum oxide layers were formed as the first and second boundary layers by sputtering an aluminum oxide target using argon gas was prepared and evaluated. As shown in Table 2, it could be confirmed that all of erasure characteristics, jitter, cross erasure, reproducing light deterioration, repetition durability and storage durability were good.

EXAMPLE 25

An optical recording medium similar to that of Example 23 except that 2 nm silicon carbide layers were formed as the first and second boundary layers by sputtering a silicon carbide target using argon gas was prepared and evaluated. As shown in Table 2, it could be confirmed that all of erasure characteristics, jitter, cross erasure, reproducing light deterioration, repetition durability and storage durability were good.

EXAMPLE 26

An optical recording medium similar to that of Example 22 except that the composition of the recording layer was $Ge_{36.3}Sb_{10.6}Te_{52.1}Nb_1$, i.e., $\{(Ge_{0.5}Te_{0.5})_{0.733}(Sb_{0.4}Te_{0.6})_{0.267}\}_{0.99}Nb_{0.01}$ was prepared and evaluated. As shown in Table 2, it could be confirmed that all of erasure characteristics, jitter, cross erasure, reproducing light deterioration, repetition durability and storage durability were good.

COMPARATIVE EXAMPLE 1

An optical recording medium similar to that of Example 1 except that the first and second boundary layers were not formed was prepared and evaluated. The effective erasure rate was 15 dB, being very poor compared to that of Example 1. So, the overwriting jitter was also aggravated, and the jitter after recording 100 times became as large as 11.5%. After overwriting 100,000 times, the reproduced signal amplitude declined, and the jitter was as large as 18%, causing such problems as error rate increase.

Furthermore, this disc was used for recording once, and the byte error rate in this case was measured and found to be $3.0 \times 10^{-5}$. The disc as recorded was allowed to stand in air not adjusted in humidity by humidification, etc. at 80° C. for 100 hours. Then, the bite error rate of the same portion was measured and found to be $3.9 \times 10^{-5}$, showing little change. However, when overwriting was executed once on this portion, the byte error rate was $4.3 \times 10^{-3}$, showing that the overwriting characteristics after long-term storage were very poor.

COMPARATIVE EXAMPLE 2

An optical recording medium similar to that of Example 1 except that the absorption correction layer was not formed was prepared and evaluated. However, to optimize the optical conditions, the thickness of the first dielectric layer, recording layer and second dielectric layer were 160 nm, 12 nm and 17 nm respectively.

The ratio of the light absorptivity of the crystalline region of the recording layer to that of the amorphous region (Ac/Aa) at a wavelength of 660 nm was 0.8, and since no absorption correction layer was formed, the light absorptivity ratio was small. The effective erasure rate was 21 dB, being poor compared to that of Example 1. The jitter after recording 100 times was 8.7%, and the jitter containing the influence of cross erasure by repeated recording on the adjacent tracks was 9.7%, to show that the jitter rise affected by the cross erasure was large. Furthermore, the track used for recording 100 times was used for reproducing repetitively 1000 times, and the jitter was found to be 13.0%, to show reproducing light deterioration.

As shown in Table 2, repetition durability and storage durability were good.

COMPARATIVE EXAMPLE 3

An optical recording medium similar to that of Example 1 except that a 50 nm thick titanium layer (refractive index 2.5, attenuation coefficient 3.2 was formed as the absorption correction layer by sputtering a titanium target using argon gas was prepared and evaluated. The light absorptivity ratio (Ac/Aa) at a wavelength of 660 nm was 0.9, being rather smaller than that of Example 1. The effective erasure rate was 23 dB, being rather poor compared to that of Example 1. The jitter after recording 100 times was 8.8%, and the jitter containing the influence of cross erasure by repeated recording on the adjacent tracks was 9.8%. That is, the jitter rise affected by the cross erasure was large.

Furthermore, even when Ni, W, Mo, V, Nb, Cr or Fe was used instead of Ti as the absorption correction layer, almost similar results were obtained.

COMPARATIVE EXAMPLE 4

An optical recording medium similar to that of Example 1 except that the composition of the recording layer was $Ge_{47.9}Sb_{2.5}Te_{49.6}$, i.e., $\{(Ge_{0.5}Te_{0.5})_{0.97}(Sb_{0.4}Te_{0.6})_{0.03}\}_{0.987}Sb_{0.013}$ was prepared and evaluated. The effective erasure rate was 13 dB, being very low compared to that of Example 1. So, the jitter after recording 100 times was as large as 11.6%.

COMPARATIVE EXAMPLE 5

An optical recording medium similar to that of Example 1 except that the composition of the recording layer was $Ge_{19.7}Sb_{25.0}Te_{55.3}$, i.e., $\{(Ge_{0.5}Te_{0.5})_{0.40}(Sb_{0.4}Te_{0.6})_{0.60}\}_{0.987}Sb_{0.013}$ was prepared and evaluated. The effective erasure rate was 25 dB, showing good erasure characteristics. However, the difference between the reflectance of the recording layer in the crystalline state and that in the amorphous state was 14%, being small compared to that of Example 1, and the jitter after overwriting 100 times was as large as 9.8%.

COMPARATIVE EXAMPLE 6

An optical recording medium similar to that of Example 1 except that the composition of the recording layer was $Ge_{28.6}Sb17.1Te_{54.3}$, i.e., $(Ge_{0.5}Te_{0.5})_{0.572}(Sb_{0.4}Te_{0.6})_{0.428}$ was prepared and evaluated. As shown in Table 2, erasure characteristics, jitter, cross erasure and repetition durability were good.

The disc was used for recording once, and the byte error rate in this case was measured and found to be $1.2\times10^{-5}$. The disc as recorded was allowed to stand in air not adjusted in humidity by humidification, etc. at 80° C. for 100 hours. Then, the byte error rate of the same portion was measured and found to have remarkably increased to $1.4\times10^{-3}$, to show that the reproduction characteristics after long-term storage were poor.

COMPARATIVE EXAMPLE 7

An optical recording medium similar to that of Example 1 except that the composition of the recording layer was $Ge_{25.7}Sb_{25.4}Te_{48.9}$, i.e., $\{(Ge_{0.5}Te_{0.5})_{0.572}(Sb_{0.4}Te_{0.6})_{0.428}\}_{0.9}Sb_{0.1}$ was prepared and evaluated. The effective erasure rate was 18 dB, being poor compared to that of Example 1.

The disc was used for recording once, and the byte error rate in this case was measured and found to be $2.3\times10^{-5}$. The disc as recorded was allowed to stand in air not adjusted in humidity by humidification, etc. at 80° C. for 100 hours. Then, the byte error rate of the same portion was measured and found to be $3.0\times10^{-5}$, showing little change, hence showing that the reproduction characteristics after long-term storage were good. However, when overwriting was executed once on the same portion, the byte error rate was found to have remarkably increased to $3.4\times10^{-3}$. That is, the overwriting characteristics after long-term storage were poor.

COMPARATIVE EXAMPLE 8

An optical recording medium similar to that of Example 1 except that the composition of the recording layer was $Ge_{20}Sb_{12}Te_{38}Nb_{30}$, i.e., $\{(Ge_{0.5}Te_{0.5})_{0.572}(Sb_{0.4}Te_{0.6})_{0.428}\}_{0.7}Nb_{0.3}$ was prepared and evaluated. The effective erasure rate was 19 dB, being very poor compared to that of Example 1. The jitter after overwriting 100 times was also as large as 10.7%, being poor compared to that of Example 1. After overwriting 100,000 times, the reproduced signal amplitude declined, and the jitter was as large as 17%, causing such problems as error rate increase.

The disc was used for recording once, and the byte error rate in this case was measured and found to be $8.5\times10^{-5}$. The disc as recorded was allowed to stand in air not adjusted in humidity by humidification, etc. at 80° C. for 100 hours. Then, the byte error rate of the same portion was measured and found to be $9.5\times10^{-5}$, showing little change, hence showing that the reproduction characteristics after long-term storage were good. However, when overwriting was executed once on the same portion, the byte error rate was found to have remarkably increased to $8.5\times10^{-5}$. That is, the overwriting characteristics after long-term storage were poor.

COMPARATIVE EXAMPLE 9

An optical recording medium similar to that of Example 1 except that a 50 nm thick aluminum oxide layer ($AlO_{0.25}$, refractive index 2.0, attenuation coefficient 3.5) was formed as the absorption correction layer by sputtering an aluminum target using a mixed gas consisting of argon and oxygen but different from that of Example 1 in composition was prepared and evaluated. The light absorptivity ratio (Ac/Aa) at a wavelength of 660 nm was 0.9, being rather small compared to that of Example 1. The effective erasure rate was 21 dB, being rather poor compared to that of Example 1. The jitter after recording 100 times was 8.5% respectively on the land and the groove, and the jitter containing the influence of cross erasure by repeated recording on the adjacent tracks was 9.3%, showing that the jitter rise due to the cross erasure was rather large.

COMPARATIVE EXAMPLE 10

An optical recording medium similar to that of Example 1 except that a 50 nm thick aluminum oxide layer ($AlO_{0.90}$, refractive index 2.2, attenuation coefficient 0.4) was formed as the absorption correction layer by sputtering an aluminum target using a mixed gas consisting of argon and oxygen different from that of Example 1 in composition was prepared and evaluated. The light absorptivity ratio (Ac/Aa) at a wavelength of 660 nm was 0.8, being small compared to that of Example 1. The effective erasure rate was 18 dB, being poor compared to that of Example 1. The jitter after recording 100 times was 9.0%, and the jitter containing the influence of cross erasure by repeated recording on the adjacent tracks was 10.1%, showing that the jitter rise due to the cross erasure was rather large.

TABLE 1

| | 1st boundary layer | | Recording layer | | | | | | | 2nd boundary layer | | Absorption correction layer | | |
|---|---|---|---|---|---|---|---|---|---|---|---|---|---|---|
| | Composition | Thickness (nm) | Composition | Thickness (nm) | A | x | y | z | k | Composition | Thickness (nm) | Composition | Thickness (nm) | Refractive index | Attenuation coefficient |
| Example 1 | C | 2 | Ge28.6Sb17.8Te53.6 | 10 | — | 0.579 | 0.011 | 0 | 0 | GeN1.2 | 2 | AlO 0.41 | 50 | 2.2 | 2.1 |
| Example 2 | GeN1.2 | 2 | Ge28.6Sb17.8Te53.6 | 10 | — | 0.579 | 0.011 | 0 | 0 | GeN1.2 | 2 | AlO 0.41 | 50 | 2.2 | 2.1 |
| Example 3 | GeN1.2 | 2 | Ge28.8Sb18.8Te52.4 | 10 | — | 0.594 | 0.031 | 0 | 0 | GeN1.2 | 2 | AlO 0.41 | 50 | 2.2 | 2.1 |
| Example 4 | C | 2 | Ge28.8Sb18.8Te52.4 | 10 | — | 0.579 | 0.011 | 0 | 0 | C | 2 | AlO 0.41 | 50 | 2.2 | 2.1 |
| Example 5 | GeCr0.25N1.2 | 2 | Ge28.8Sb18.8Te52.4 | 10 | — | 0.594 | 0.031 | 0 | 0 | GeCr0.25N1.2 | 2 | AlO 0.41 | 50 | 2.2 | 2.1 |
| Example 6 | C | 2 | Ge22.2Sn7.4Sb17.1Te53.3 | 10 | — | 0.6 | 0.013 | 0 | 0.25 | GeN1.2 | 2 | AlO 0.41 | 50 | 2.2 | 2.1 |
| Example 7 | Al2O3 | 2 | Ge28.8Sb18.8Te52.4 | 10 | — | 0.594 | 0.031 | 0 | 0 | Al2O3 | 2 | AlO 0.41 | 50 | 2.2 | 2.1 |
| Example 8 | SiC | 2 | Ge28.8Sb18.8Te52.4 | 10 | — | 0.594 | 0.031 | 0 | 0 | SiC | 2 | AlO 0.41 | 50 | 2.2 | 2.1 |
| Example 9 | C | 2 | Ge36Sb12Te52 | 10 | — | 0.733 | 0.013 | 0 | 0 | GeN1.2 | 2 | AlO 0.41 | 50 | 2.2 | 2.1 |
| Example 10 | C | 2 | Ge28.3Sb16.9Te53.8Nb1 | 10 | Nb | 0.572 | 0 | 0.01 | 0 | GeN1.2 | 2 | AlO 0.64 | 50 | 2.8 | 1.5 |
| Example 11 | C | 2 | Ge28.6Sb17.8Te53.6 | 10 | — | 0.579 | 0.011 | 0 | 0 | GeN1.2 | 2 | AlO 0.64 | 50 | 2.8 | 1.5 |
| Example 12 | C | 2 | Ge28.8Sb18.8Te52.4 | 10 | — | 0.594 | 0.031 | 0 | 0 | GeN1.2 | 2 | CrN 0.74 | 50 | 3.2 | 2.3 |
| Example 13 | C | 2 | Ge28.8Sb18.8Te52.4 | 10 | — | 0.579 | 0.011 | 0 | 0 | GeN1.2 | 2 | CrN 0.91 | 50 | 3.5 | 1.7 |
| Example 14 | C | 2 | Ge28.6Sb17.8Te53.6 | 10 | — | 0.579 | 0.011 | 0 | 0 | GeN1.2 | 2 | Al—N | 50 | 2.2 | 2.0 |
| Example 15 | GeN0.8 | 2 | Ge28.8Sb18.8Te52.4 | 10 | — | 0.594 | 0.031 | 0 | 0 | GeN0.8 | 2 | AlO 0.41 | 50 | 2.2 | 2.1 |
| Example 16 | GeCr0.25N0.8 | 2 | Ge28.8Sb18.8Te52.4 | 10 | — | 0.594 | 0.031 | 0 | 0 | GeCr0.25N0.8 | 2 | AlO 0.41 | 50 | 2.2 | 2.1 |
| Example 17 | GeCr0.2N1.2 | 2 | Ge28.8Sb18.8Te52.4 | 10 | — | 0.594 | 0.031 | 0 | 0 | GeCr0.2N1.2 | 2 | AlO 0.41 | 50 | 2.2 | 2.1 |
| Example 18 | GeCr0.4N1.2 | 2 | Ge28.8Sb18.8Te52.4 | 10 | — | 0.594 | 0.031 | 0 | 0 | GeCr0.4N1.2 | 2 | AlO 0.41 | 50 | 2.2 | 2.1 |
| Example 19 | C | 2 | Ge36Sb12Te52 | 9 | — | 0.733 | 0.013 | 0 | 0 | C | 2 | AlO 0.41 | 70 | 2.2 | 2.1 |
| Example 20 | C | 2 | Ge36Sb12Te52 | 9 | — | 0.733 | 0.013 | 0 | 0 | C | 2 | CrN 0.74 | 50 | 3.2 | 2.3 |
| Example 21 | C | 2 | Ge36Sb12Te52 | 12 | — | 0.733 | 0.013 | 0 | 0 | C | 2 | AlO 0.64 | 50 | 2.8 | 1.5 |
| Example 22 | C | 2 | Ge36Sb12Te52 | 12 | — | 0.733 | 0.013 | 0 | 0 | C | 2 | CrN 0.91 | 50 | 3.5 | 1.7 |
| Example 23 | GeN1.2 | 2 | Ge35Sb14Te51 | 12 | — | 0.733 | 0.033 | 0 | 0 | GeN1.2 | 2 | CrN 0.91 | 50 | 3.5 | 1.7 |
| Example 24 | Al2O3 | 2 | Ge35Sb14Te51 | 12 | — | 0.733 | 0.033 | 0 | 0 | Al2O3 | 2 | CrN 0.91 | 50 | 3.5 | 1.7 |
| Example 25 | SiC | 2 | Ge35Sb14Te51 | 12 | — | 0.733 | 0 | 0 | 0 | SiC | 2 | CrN 0.91 | 50 | 3.5 | 1.7 |
| Example 26 | C | 2 | Ge36.3Sb10.6Te52.1Nb1 | 12 | Nb | 0.733 | 0 | 0.01 | 0 | C | 2 | AlO 0.41 | 50 | 2.2 | 2.1 |
| Comparative Example 1 | none | | Ge28.6Sb17.8Te53.6 | 10 | — | 0.579 | 0.011 | 0 | 0 | none | | none | | — | — |
| Comparative Example 2 | C | 2 | Ge28.6Sb17.8Te53.6 | 10 | — | 0.579 | 0.011 | 0 | 0 | GeN1.2 | 2 | Ti | 50 | 2.5 | 3.2 |
| Comparative Example 3 | C | 2 | Ge47.9Sb2.5Te49.6 | 10 | — | 0.97 | 0.013 | 0 | 0 | GeN1.2 | 2 | AlO 0.41 | 50 | 2.2 | 2.1 |
| Comparative Example 4 | C | 2 | Ge19.7Sb25.0Te55.3 | 10 | — | 0.4 | 0.013 | 0 | 0 | GeN1.2 | 2 | AlO 0.41 | 50 | 2.2 | 2.1 |
| Comparative Example 5 | C | 2 | Ge28.6Sb17.1Te54.3 | 10 | — | 0.572 | 0 | 0 | 0 | GeN1.2 | 2 | AlO 0.41 | 50 | 2.2 | 2.1 |
| Comparative Example 6 | C | 2 | Ge25.7Sb25.4Te48.9 | 10 | — | 0.572 | 0.1 | 0 | 0 | GeN1.2 | 2 | AlO 0.41 | 50 | 2.2 | 2.1 |
| Comparative Example 7 | C | 2 | Ge20Sb12Te38Nb30 | 10 | Nb | 0.572 | 0 | 0.3 | 0 | GeN1.2 | 2 | AlO 0.41 | 50 | 2.2 | 2.1 |
| Comparative Example 8 | C | 2 | Ge28.6Sb17.8Te53.6 | 10 | — | 0.579 | 0.011 | 0 | 0 | GeN1.2 | 2 | AlO 0.25 | 50 | 2.0 | 3.5 |
| Comparative Example 9 | C | 2 | Ge28.6Sb17.8Te53.6 | 10 | — | 0.579 | 0.011 | 0 | 0 | GeN1.2 | 2 | AlO 0.9 | 50 | 2.2 | 0.4 |

TABLE 2

| | Reflectance difference (%) | Ac/Aa | effective erasure rate (dB) | Jitter after overwriting 100 times (%) | Jitter after cross erasure test (%) | Characteristics after overwriting 100,000 times | | | | Byte error rate after recording once (×10⁻⁵) | Characteristics after long-term storage | | |
|---|---|---|---|---|---|---|---|---|---|---|---|---|---|
| | | | | | | Reproducing light deterioration | Jitter (%) | Signal amplitude | Burst defect | | Byte error rate (×10⁻⁵) | Byte error rate due to overwriting (×10⁻⁵) | Burst defect |
| Example 1 | 20 | 1.0 | 28 | 7.7 | 7.9 | Not observed | 9.8 | No change | Not observed | 1.0 | 1.6 | 3.2 | Not observed |
| Example 2 | 20 | 1.0 | 28 | 7.8 | 8.0 | Not observed | 9.3 | No change | Not observed | 1.2 | 12 | 17 | Not observed |
| Example 3 | 20 | 1.0 | 25 | 8.3 | 8.6 | Not observed | 9.2 | No change | Not observed | 2.0 | 5.6 | 9.0 | Not observed |
| Example 4 | 20 | 1.0 | 25 | 8.1 | 8.4 | Not observed | 10.5 | No change | Not observed | 2.0 | 2.0 | 3.6 | Not observed |
| Example 5 | 20 | 1.0 | 25 | 8.2 | 8.5 | Not observed | 9.3 | No change | Not observed | 1.8 | 3.6 | 7.2 | Not observed |
| Example 6 | 19 | 1.0 | 28 | 7.9 | 8.1 | Not observed | 9.7 | No change | Not observed | 1.0 | 1.8 | 2.7 | Not observed |
| Example 7 | 20 | 1.0 | 25 | 8.3 | 8.6 | Not observed | 11.0 | No change | Not observed | 2.0 | 6.4 | 18 | Not observed |
| Example 8 | 20 | 1.0 | 24 | 8.4 | 8.7 | Not observed | 11.5 | No change | Not observed | 3.0 | 11 | 25 | Not observed |
| Example 9 | 23 | 1.0 | 24 | 8.3 | 8.6 | Not observed | 10.0 | No change | Not observed | 2.5 | 4.5 | 11 | Not observed |
| Example 10 | 20 | 1.0 | 27 | 8.1 | 8.4 | Not observed | 9.9 | No change | Not observed | 1.9 | 3.8 | 8.7 | Not observed |
| Example 11 | 22 | 1.0 | 24 | 8.4 | 8.8 | Not observed | 10.3 | No change | Not observed | 3.2 | 6.1 | 12 | Not observed |
| Example 12 | 19 | 1.2 | 25 | 8.2 | 8.5 | Not observed | 10.1 | No change | Not observed | 2.2 | 4.0 | 9.6 | Not observed |
| Example 13 | 20 | 1.1 | 24 | 8.4 | 8.9 | Not observed | 10.5 | No change | Not observed | 3.0 | 5.1 | 11 | Not observed |
| Example 14 | 20 | 1.0 | 24 | 8.3 | 8.7 | Not observed | 9.8 | No change | Not observed | 2.5 | 5.0 | 11 | Not observed |
| Example 15 | 20 | 1.0 | 25 | 8.3 | 8.6 | Not observed | 10.3 | No change | Not observed | 2.0 | 4.4 | 7.9 | Not observed |
| Example 16 | 20 | 1.0 | 25 | 8.2 | 8.5 | Not observed | 10.1 | No change | Not observed | 2.0 | 3.6 | 7.2 | Not observed |
| Example 17 | 20 | 1.0 | 25 | 8.2 | 8.5 | Not observed | 9.3 | No change | Not observed | 2.0 | 9.0 | 9.0 | Not observed |
| Example 18 | 20 | 1.0 | 25 | 8.2 | 8.5 | Not observed | 10.1 | No change | Not observed | 2.0 | 3.4 | 7.8 | Not observed |
| Example 19 | 19 | 1.2 | 28 | 8.3 | 8.6 | Not observed | 11.0 | No change | Not observed | 1.5 | 2.5 | 4.1 | Not observed |
| Example 20 | 18 | 1.2 | 25 | 8.4 | 8.7 | Not observed | 11.0 | No change | Not observed | 1.5 | 2.5 | 4.1 | Not observed |
| Example 21 | 20 | 1.1 | 25 | 9.3 | 9.7 | Not observed | 11.0 | No change | Not observed | 2.0 | 2.8 | 5.0 | Not observed |
| Example 22 | 19 | 1.2 | 28 | 9.0 | 9.3 | Not observed | 11.0 | No change | Not observed | 2.5 | 3.0 | 4.1 | Not observed |
| Example 23 | 21 | 1.2 | 28 | 8.8 | 9.1 | Not observed | 10.0 | No change | Not observed | 2.3 | 3.2 | 4.5 | Not observed |
| Example 24 | 21 | 1.0 | 25 | 9.0 | 9.4 | Not observed | 11.3 | No change | Not observed | 2.0 | 4.0 | 9.2 | Not observed |
| Example 25 | 21 | 1.0 | 25 | 9.0 | 9.4 | Not observed | 11.3 | No change | Not observed | 2.0 | 7.0 | 18 | Not observed |
| Example 26 | 21 | 1.0 | 27 | 9.2 | 9.5 | Not observed | 12.0 | No change | Not observed | 2.0 | 2.6 | 3.1 | Not observed |
| Comparative Example 1 | 20 | 1.0 | 15 | 11.5 | | | 18.0 | Declined | Not observed | 3.0 | 3.9 | 430 | Not observed |
| Comparative Example 2 | 24 | 0.8 | 21 | 8.7 | 9.7 | Observed | 10.8 | No change | Not observed | 3.5 | 7.4 | 18 | Not observed |
| Comparative Example 3 | 21 | 0.9 | 23 | 8.8 | 9.8 | | | | | | | | |
| Comparative Example 4 | 22 | | 13 | 11.6 | | | | | | | | | |
| Comparative Example 5 | 14 | | 25 | 9.8 | | | | | | | | | |
| Comparative Example 6 | 20 | | 28 | 8.0 | 8.2 | | 10.1 | No change | | 1.2 | 140 | | |
| Comparative Example 7 | 20 | | 18 | 8.9 | | | | | | 2.3 | 3.0 | 340 | |
| Comparative Example 8 | 20 | | 19 | 10.7 | | | 17.0 | Declined | | | | | |
| Comparative Example 9 | 19 | 0.9 | 21 | 8.5 | 9.3 | | | | | | | | |
| Comparative Example 10 | 21 | 0.8 | 18 | 9.0 | 10.1 | | | | | 8.5 | 9.5 | 850 | |

INDUSTRIAL APPLICABILITY

This invention can provide a rewritable phase change type optical recording medium and an optical recording apparatus that are good in erasure characteristics and small in jitter even in high linear velocity high density recording, are unlikely to cause cross erasure even in the use of a substrate with a narrow track width, are unlikely to be deteriorated in signal quality even after repeated irradiation with a laser beam, and are good also in storage durability. The optical recording medium of this invention is also excellent in repetition durability.

What is claimed is:

1. An optical recording medium, that allows information to be recorded, erased and reproduced by laser beam irradiation, and in which the recording and erasure of information are achieved by reversible phase change between the amorphous phase and the crystalline phase, characterized in that at least a first dielectric layer, a first boundary layer, a recording layer, a second boundary layer, an absorption correction layer and a reflection layer are provided in this order on a substrate, that the composition of said recording layer is represented by general formula $$[\{(Ge_{1-k}Sn_k)_{0.5}Te_{0.5}\}_x(Sb_{0.4}Te_{0.6})_{1-x}]_{1-y-z}Sb_yA_z$$

(where A denotes an element selected from the elements belonging to the group 3 through group 14 of the $3^{rd}$ period through $6^{th}$ period of the periodic table excluding Ge, Sb and Te), that x, y, z and k are in the ranges respectively represented by the following formulae (1) or (2)

$$0.5 \leq x \leq 0.95,\ 0 \leq y \leq 0.08,\ 0 \leq z \leq 0.2,\ k=0 \quad (1)$$

$$0.5 \leq x \leq 0.95,\ 0.01 \leq y \leq 0.08,\ z=0,\ 0 \leq k \leq 0.5 \quad (2)$$

that the first boundary layer and the second boundary layer are respectively mainly composed of at least one selected from carbon, carbides, oxides and nitrides, and that the absorption correction layer is 1.0 to 4.0 in refractive index and 0.5 to 3.0 in attenuation coefficient.

2. An optical recording medium, according to claim 1, wherein the first boundary layer is a layer mainly composed of carbon.

3. An optical recording medium, according to claim 1, wherein the first boundary layer and the second boundary layer are layers mainly composed of carbon.

4. An optical recording medium, according to claim 1, wherein the first boundary layer and the second boundary layer are layers mainly composed of at least one selected from carbides, oxides and nitrides, and the composition of the recording layer is represented by the following formula:

$$\{(Ge_{0.5}Sn_{0.5})_x(Sb_{0.4}Te_{0.6})_{1-x}\}_{1-y-z}Sb_yA_z$$

(where A denotes an element selected form the elements belonging to the group 3 through group 14 of the $3^{rd}$ period through $6^{th}$ period of the periodic table excluding Ge, Sb and Te, and x, y and z are in the ranges respectively represented by the following formulae:

$$0.5 \leq x \leq 0.95,\ 0.03 \leq y \leq 0.08,\ 0 \leq z \leq 0.2).$$

5. An optical recording medium, according to claim 1, wherein the absorption correction layer is made of a material mainly composed of the oxides or nitrides of metals containing at least one of Al and Cr.

6. An optical recording medium, according to claim 5, wherein the absorption correction layer is mainly composed of $AlO_x$ (x=0.3 to 0.8).

7. An optical recording medium, according to claim 1, wherein the first dielectric layer is 1.9 to 2.4 in refractive index and 0.1 or less in attenuation coefficient.

8. An optical recording medium, according to claim 1, wherein the thickness of the first dielectric layer is 50 nm to 200 nm; the thickness of the recording layer is 7 nm to 17 nm; and the thickness of the absorption correction layer is 10 nm to 100 nm.

9. An optical recording medium, according to claim 1, wherein the refractive index and the attenuation coefficient are measured at the wavelength of the laser beam used for recording or reproduction.

10. An optical recording medium, according to claim 1, wherein the refractive index and the attenuation coefficient are measured at a laser beam wavelength of 660 nm.

11. An optical recording apparatus, having an optical head and an optical recording medium, in which the laser beam from said optical head is applied to allow information to be recorded, erased and reproduced by reversible phase change between the amorphous phase and the crystalline phase in the optical recording medium, characterized in that the linear velocity of laser beam irradiation is $7.5 \times 10^6 \times d$ (d is the laser beam diameter on the recording surface) or more per second, that the length of the shortest mark of the recorded marks recorded according to the mark edge method by the laser beam is 0.55×d or less in the laser beam propagation direction, that the track width of the optical recording medium is 0.7×d or less, and that the optical recording medium is the optical recording medium as set forth in any one of claims 1 through 10.

12. An optical recording apparatus, according to claim 11, wherein the wavelengths of the laser beams used for recording, erasure and reproduction are 645 to 660 nm.

* * * * *